April 5, 1927.  1,623,538
R. S. HOPKINS
AUTOMATICALLY FOCUSING CAMERA
Filed Jan. 26, 1922    3 Sheets-Sheet 1
FIG_1_
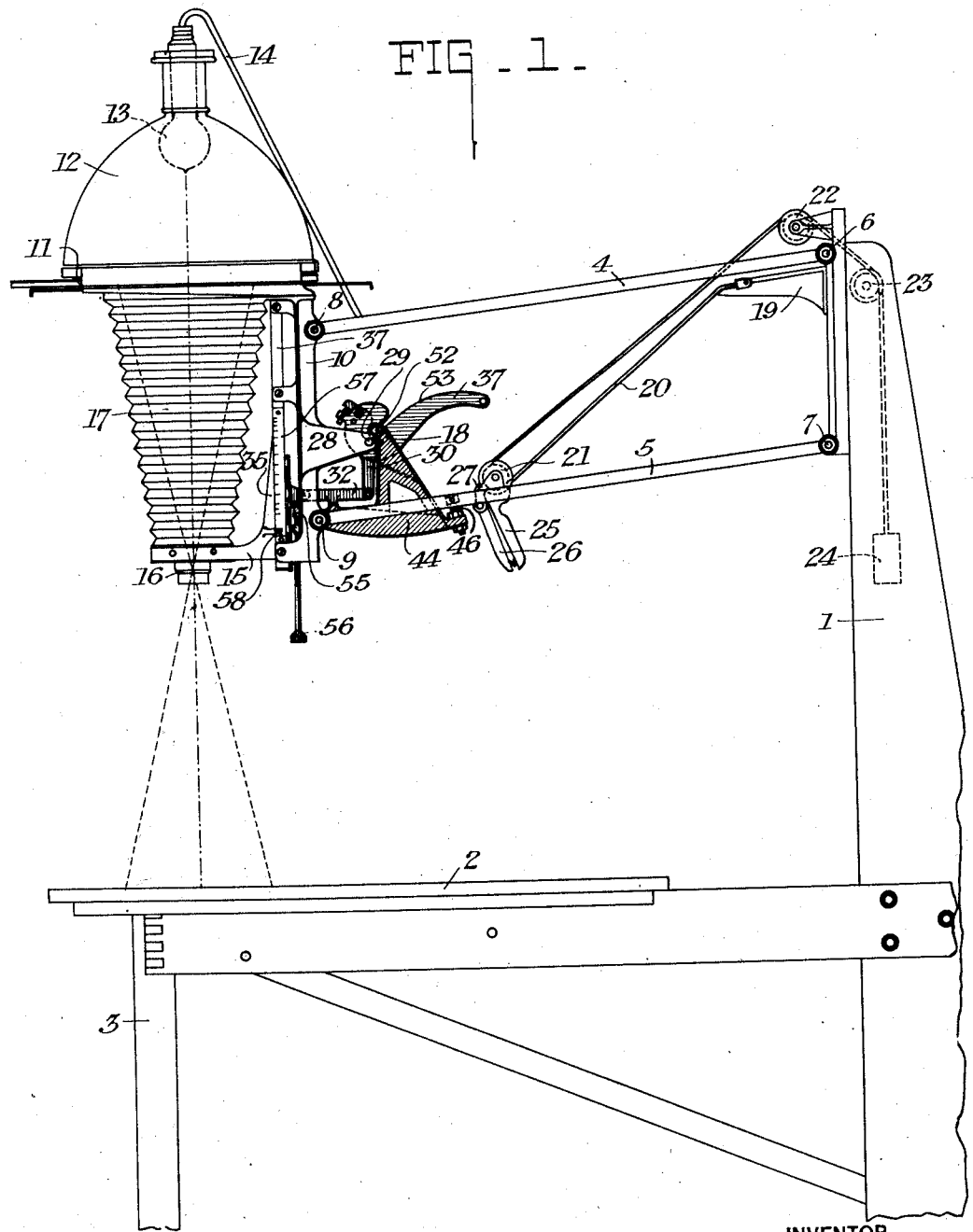
WITNESS
INVENTOR
Roy S. Hopkins,
ATTORNEYS.

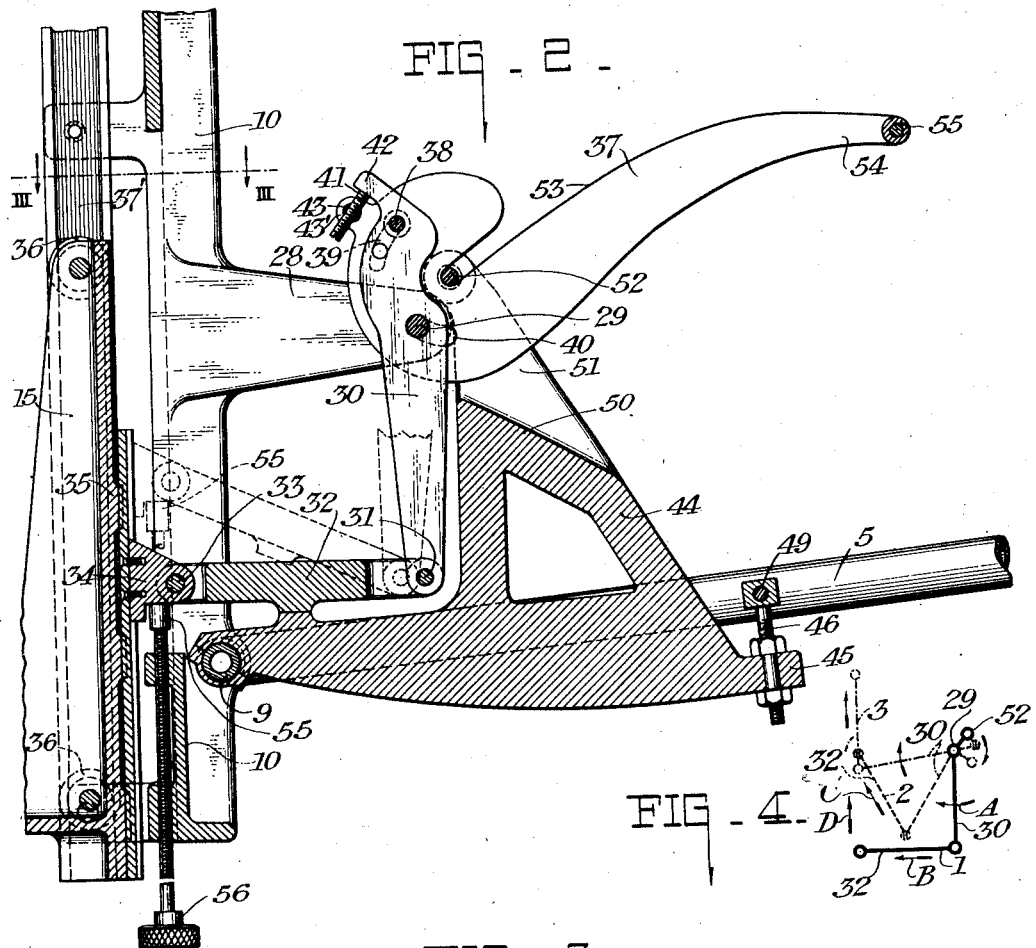
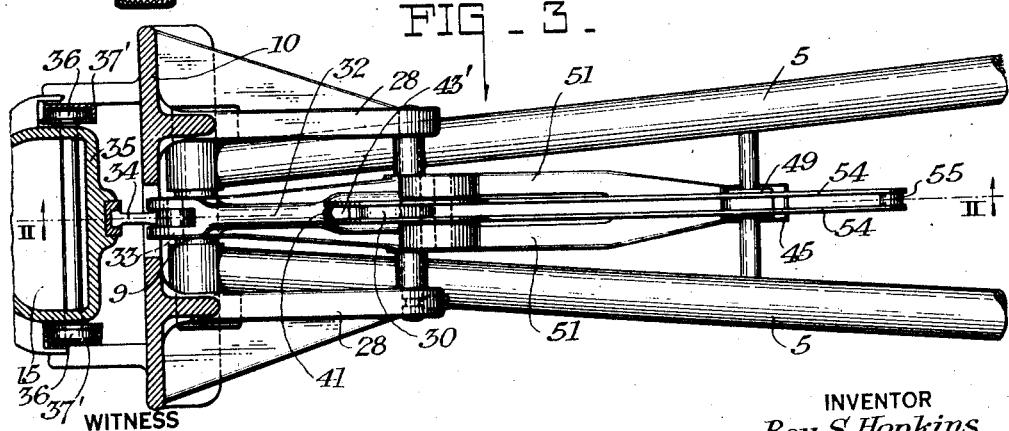

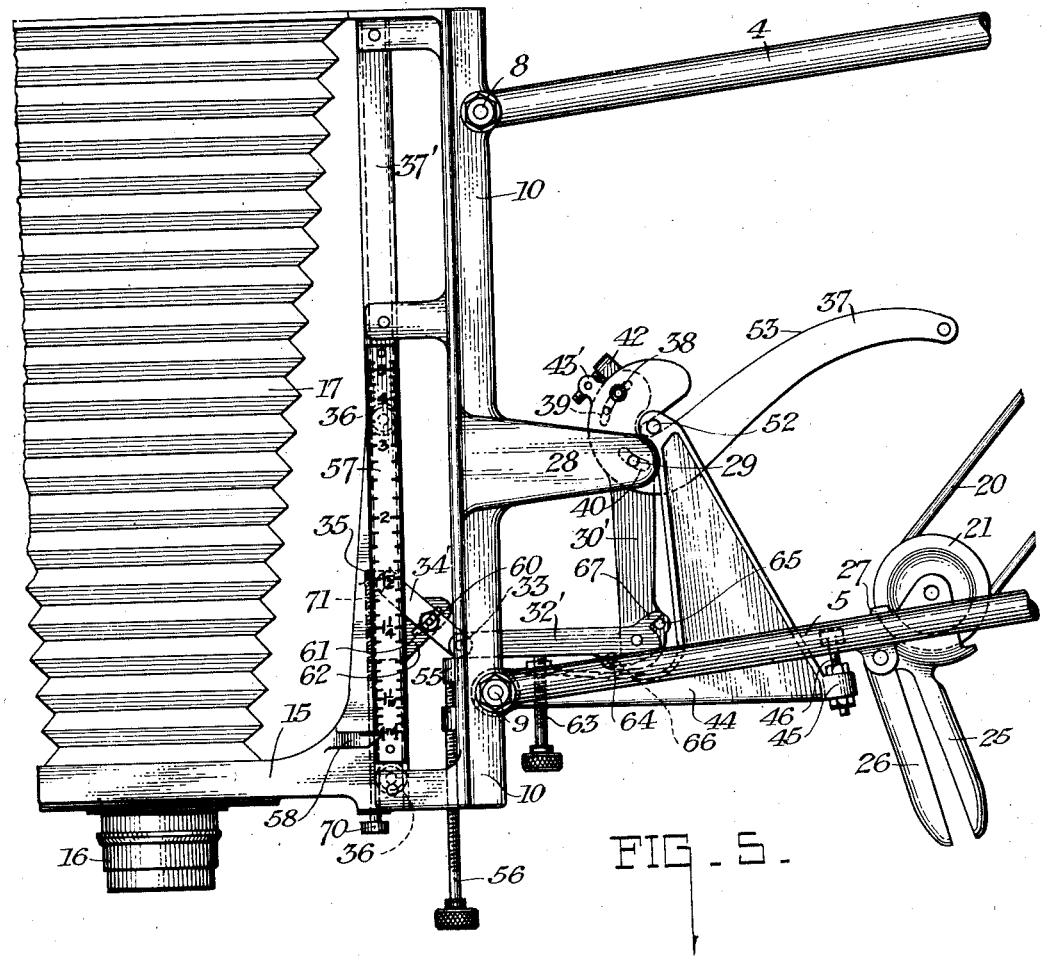

Patented Apr. 5, 1927.

1,623,538

UNITED STATES PATENT OFFICE.

ROY S. HOPKINS, OF PARKERSBURG, WEST VIRGINIA.

AUTOMATICALLY-FOCUSING CAMERA.

Application filed January 26, 1922. Serial No. 532,003.

This invention relates to automatically focusing cameras, particularly of the type intended for copying and enlarging purposes. More especially it relates to certain improvements in devices of the type shown in my Patents No. 1,297,402, issued Nov. 20, 1917, and No. 1,325,154, issued Dec. 16, 1919.

The objects of the invention are to make such a camera, having an improved form of connection between the lens holder and negative holder and in which the size of the projected image may be the same as that of the negative, and to provide certain features of adjustment in the mechanism of the camera. These and other objects will be more fully pointed out in the following specification and claims.

Reference will now be made to the figures of the drawing, in which the same reference characters refer to the same parts throughout and in which:

Fig. 1 is an elevation of the complete apparatus, a part of the supporting stand being broken away;

Fig. 2 is a detailed view in section of the mechanism connecting the negative and lens holders, taken on the line 2—2 of Fig. 3;

Fig. 3 is a sectional view showing the same parts and taken on line 3—3 of Fig. 2;

Fig. 4 is a diagram illustrative of the movement of the link mechanism;

Fig. 5 is a detailed view of connecting mechanisms embodying certain adjustments.

A main, upright, hollow support 1 has attached thereto a horizontal easel 2 which is also supported by suitable legs 3. At the upper end of the support there are pivoted two pairs of arms, 4 and 5 respectively, at the pivot points 6 and 7. At the outer ends of these arms, and pivoted at 8 and 9 respectively, is the upright member 10, there being thus formed a parallelogram, the angular relation of the sides of which is changeable. Carried upon the support 10 is a negative holder 11, above which is a lamphouse 12 containing a lamp 13 which is connected by the electrical cable 14 to any source of current. Slidable on the support 10 is the lens support 15 carrying the lens in the mount 16, the lens and negative holder being connected by bellows 17. The support 10 and the movable lens board carry a mechanism 18 connecting these parts and operative when properly adjusted to maintain the lens board and negative holder in such positions relative to each other and the easel that the negative and the easel will be automatically kept at conjugate focal points of the lens,— that is, the lens will at all times focus an image of the negative upon the easel, or vice versa would focus the image of an object on the easel upon the plane of the negative.

Fixed on a bracket 19 upon the support 1 is a cord 20 which passes around a pulley 21 mounted on the lower arms 5 and thence back over a pulley 22 mounted on the main support and thence over a pulley 23 in the hollow support 1, and carrying at its lower end a counterbalancing weight 24. A controlling handle comprises a member 25 affixed to the lower arms 5 and an outwardly spring pressed member 26. The latter carries a brake bearing against the cord 20 on the pulley 21 and holds the parts in adjusted position. To operate the camera, handle 25 is grasped, releasing the brake 27, so that the arms and camera members may be raised and lowered, this action automatically adjusting the focus of the camera in a manner analogous to that of the Hopkins patents.

The detailed structure of the connecting mechanism will now be described. Support 10 carries a lug 28 through an aperture of which passes the pintle pin 29 carried by the lever member 30, the latter being pivoted at 31 to the link 32 which is in turn pivoted at 33 to a block 34 rigidly secured to the extension 35 of the lens board 15 and carrying rollers 36 movable in guides 37' carried by the support 10. The upper end of the lever 30 carries rigidly secured thereto and constituting a part thereof, a cam member 37. This is shown as made of a separate piece, the two parts being rigidly clamped together by the bolt 38, but they can be adjusted with reference to each other by the movement of bolt 38 and pin 29 in slots 39 and 40 in the cam member. To permit of such adjustment, the bolt 38 is loosened and the screw 41 pressing against an ear 42 in the lever 30 and screw threaded through a pin 43 pivoted in lug 43' on the cam member is adjusted in an obvious manner.

Upon hinged pintle 9 is pivotally secured a member 44 which has an extension 45 through which passes an adjustable bolt 46, pivoted on a pintle 49 connecting the lower bars 5. An upward extension 50 of this member is bifurcated at 51, a roller 52 connecting the bifurcations and engaging the cam surface 53 of the cam member 37. The cam member, as is clearly shown in Fig. 3, consists of two separated pieces 54 connected by a spacing lug 55.

When the apparatus is moved from the position shown in Fig. 1, a lifting of the arms will raise the support 10 which is rigidly attached to the negative holder. This will raise the pin 29, carried in a fixed position relatively thereto, with relation to the pin 52 and will move the cam about such pin 52, causing this pin or roller to move along the cam surface 53. This movement of the lever 30 will also move the link 32 and communicate motion to the lens board. Three positions of the links are indicated at 1, 2, and 3 in Fig. 4. It will be apparent that if the links are in the position shown in Fig. 2, that is position 1, that an attempt to raise the mechanism will cause rotation of the lever 30 in the direction indicated by arrow A and a movement of the link 32 in the direction indicated by arrow B at right angles to the guides. In this position the mechanism is inoperative to raise the lens board by power imposed on the negative carrier. When, however, the links are in the position shown in position 2, it is obvious that force applied to the negative carrier would move the link 32 in the direction of the arrow C and would move it up to position 3.

In order to prevent the lens board normally moving into the region from which movement applied to the negative carrier will not move it, I have furnished an adjustable stop 55 screw threaded in the support 10 and operated by a thumb screw 56. This stop is normally in the position shown in dotted lines in Fig. 2, and maintains the link 32 in the position shown in dotted lines, so that the device will at all times be completely operative.

The apparatus is so designed that when the links are at right angles to each other in position 1, as shown in Figs. 1 and 2, the magnification is unity, so that normally the apparatus may be used for projection to make enlargements having a magnification greater than 1.5:1; though, of course, the particular ratios would depend upon the constants of the machine and the setting of the stop 55. When, however, it is desired to make prints having a magnification in the region near the lower limit of the machine, the stop 55 is adjusted to the desired degree. Upon the outer side of one of the guideways 37' is a scale 57 against which a pointer 58 on the negative holder indicates the magnification. It is to be understood that the relative positions of the negative and lens holders, even in this lower region, are automatically maintained for proper focus, and that the only way in which the device is inoperative is by the application of force to the negative holder. An upward application of force to the lens holder, as in the direction of the arrow D in Fig. 4, is communicated by the connecting mechanism to the negative holder to raise them from this position in the usual way.

In Fig. 5 I have indicated certain refinements which may be used. The elements not specifically described are given the same reference characters and have the same functions as the parts already mentioned. In this case the negative carrier instead of having a rigid and fixed lug 34 has an adjustably mounted connection 34' between itself and the link 32', this being adjusted by a thumb screw connection 60, working in a slot 61 of the slidable plate 62, adjustable by means of thumb screw 70 on the support 15. This slidable plate also carries pivot 71 upon which the lug 34' turns. This lug 34' is pivoted at 33 to the link 32'. This link, instead of resting upon a fixed abutment 59 as in Fig. 2, rests upon an adjustable abutment screw 63. The link 32' and lever 30' have respectively stop pins 64 and 65, an ear 66 on the lever 30' engaging the stop pin 64 on the link and an ear 67 on the link engaging the lug 65 on the lever, these furnishing stops to limit the extreme angular movement of these members.

The principal purpose of the bolt 46 is to make adjustments to compensate for distortions in the supporting arms. The other adjustments allow for compensations to be introduced in case of variations in dimensions or positions of parts of the apparatus and variations in focal length of the lens.

It is to be understood that this camera can be used either for projecting an image of a negative or other transparency in the negative holder upon a sensitive surface on the easel, or for projecting an image of a negative, drawing, print or other object on the easel upon a sensitized sheet in the negative holder.

It is obvious that changes may be made in the structure herein shown, which is illustrative of the invention; and I contemplate as within the scope of my invention all such modifications and equivalents as fairly fall within the scope of the appended claims.

Having thus described my invention, what I claim as new and desire to secure by Letters Patent is:

1. In an automatically focusing camera having a negative holder and a lens holder movable to and from a focusing plane and connected for relative movement so that when force is applied to move one of said holders, the other will be also moved relatively thereto so that the image of the negative is automatically focused at said plane, the connections being such that such force is not transmitted in a region near one of the limits of movement, a stop normally positioned to prevent movement of said holders into the said region, said stop being adjustable to permit movement of the holders into said region into positions such that the apparatus will be in focus.

2. In an automatically focusing camera having a negative holder and a lens holder movable to and from a focusing plane and having a lever connection capable, when force is applied to move one of said holders, to move the other relatively thereto so that the image of the negative is automatically focused at said plane, but incapable to transmit force in the manner defined in a region near one of the limits of movement, a stop normally positioned to prevent movement of the holders into said region, but adjustable to permit movement of the holders into said region into positions such that the apparatus will be in focus.

3. In an automatically focusing camera, a negative holder and a lens holder movable to and from a focusing plane, connections between the holders whereby they are maintained in such relative positions that the image of the negative is automatically focused on said plane, said connections comprising a lever pivoted to said negative holder, a link pivoted to said lever and to said lens holder, said connections being capable, when force is applied to move the negative holder, of transmitting such force so as to move the lens holder, but being incapable of transmitting such force in a region near one of the limits of movement, a stop normally positioned to prevent movement of the holder into said region and adjustable to permit such movement.

4. In an automatically focusing camera, a negative holder and a lens holder movable to and from a focusing plane, connections between the holders whereby they are maintained in such relative positions that the image of the negative is automatically focused on said plane, said connections comprising a lever pivoted to the negative holder, and having a cam surface, a bearing against which said surface bears and a link pivoted to said lever and to said lens holder, that portion of the lever having the cam surface having an adjustable angular relation to that portion of the lever that is pivoted to the link.

5. In an automatically focusing camera, a negative holder and a lens holder movable to and from a focusing plane, connections between the holders whereby they are maintained in such relative positions that the image of the negative is automatically focused on said plane, said connections comprising a lever pivoted to the negative holder, and having a cam surface, a bearing against which said surface bears and a link pivoted to said lever and to said lens holder, the point of pivotal connection between the link and the lens board being adjustable.

6. In an automatically focusing camera, a negative holder and a lens holder movable to and from a focusing plane, connections between the holders whereby they are maintained in such relative positions that the image of the negative is automatically focused on said plane, said connections comprising a lever pivoted to the negative holder, and having a cam surface, a bearing against which said surface bears and a link pivoted to said lever and to said lens holder, said connections being capable of transmitting force from the negative holder to the lens holder except in a region near one of the limits of movement, and a stop normally positioned to prevent movement of the holders into said regions and adjustable to permit such movement.

7. In a copying camera, a support, a horizontal easel carried thereby, a lens holder and a negative holder carried thereby and movable to and from the easel, connections between said holders whereby they are maintained in such relative positions that the image of the negative is automatically focused on the easel, said connections comprising a roller carried by said support, a lever pivoted to the negative holder and having a cam surface adapted to ride along said roller and a link pivoted to the lever and to the lens holder, and a stop adjustable independently of the said connections and adjustably determining one of the limits of movement of said holders.

8. In a copying camera, a support, a horizontal easel carried thereby, a lens holder and a negative holder carried thereby and movable to and from the easel, connections between said holders whereby they are maintained in such relative positions that the image of the negative is automatically focused on the easel, said connections comprising a roller carried by said support, a lever pivoted to the negative holder and having a cam surface adapted to ride along said roller and a link pivoted to the lever and to the lens holder, said connections being capable of transmitting movement from the negative holder to the lens holder except in a region near one of the limits of movement, and a stop normally positioned to prevent movement of the holders into such region but adjustable to permit their movement into such region.

9. In an automatically focusing camera, a negative holder and a lens holder movable to and from a focusing plane, connections between the holders whereby they are maintained in such relative positions that the image of the negative is automatically focused on said plane, said connections comprising a lever pivoted to the negative holder, and having a cam surface, a bearing against which said surface bears and a link pivoted to said lever and to said lens holder.

10. In a copying camera, a support, a horizontal easel carried thereby, a lens holder and a negative holder carried thereby and movable to and from the easel, connections between said holders whereby they are maintained in such relative positions that the image of the negative is automatically focused on the easel, said connections comprising a roller carried by said support, a lever pivoted to the negative holder and having a cam surface adapted to ride along said roller and a link pivoted to the lever and to the lens holder.

Signed at Rochester, New York, this 23rd day of January, 1922.

ROY S. HOPKINS.